US012719768B2

(12) United States Patent
Zhang et al.

(10) Patent No.: US 12,719,768 B2
(45) Date of Patent: Aug. 25, 2026

(54) COORDINATION OF QUALITY OF EXPERIENCE MANAGEMENT COLLECTION CONFIGURATION

(71) Applicant: ZTE CORPORATION, Shenzhen (CN)

(72) Inventors: Man Zhang, Shenzhen (CN); Yin Gao, Shenzhen (CN); Dapeng Li, Shenzhen (CN); Yansheng Liu, Shenzhen (CN); Zhuang Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 34 days.

(21) Appl. No.: 18/647,076

(22) Filed: Apr. 26, 2024

(65) Prior Publication Data

US 2024/0275698 A1 Aug. 15, 2024

Related U.S. Application Data

(63) Continuation of application No. PCT/CN2022/130004, filed on Nov. 4, 2022.

(51) Int. Cl.
*H04L 41/5067* (2022.01)

(52) U.S. Cl.
CPC ................................ *H04L 41/5067* (2013.01)

(58) Field of Classification Search
None
See application file for complete search history.

(56) References Cited

U.S. PATENT DOCUMENTS

| | | | | |
|---|---|---|---|---|
| 10,206,216 | B2 * | 2/2019 | Cao | H04W 72/51 |
| 10,314,043 | B2 * | 6/2019 | Cao | H04W 56/0045 |
| 10,986,533 | B2 * | 4/2021 | Yang | H04L 47/76 |
| 10,993,153 | B2 * | 4/2021 | Teyeb | G01R 31/318342 |
| 11,240,701 | B2 * | 2/2022 | Fiorani | H04W 72/543 |
| 2017/0026880 | A1 * | 1/2017 | Cao | H04W 56/0045 |
| 2017/0026950 | A1 * | 1/2017 | Cao | H04L 5/0032 |
| 2020/0022034 | A1 * | 1/2020 | Shi | H04W 24/10 |

(Continued)

FOREIGN PATENT DOCUMENTS

| | | |
|---|---|---|
| CN | 115211164 A | 10/2022 |
| WO | WO-2021/098074 A1 | 5/2021 |

(Continued)

OTHER PUBLICATIONS

Ericsson, "Discussion on incoming LSes for QoE measurement collection in LTE", 3GPP TSG RAN WG2 #110-e, R2-2004623, Jun. 12, 2020, Electronic Meeting (6 pages).

(Continued)

*Primary Examiner* — Ranodhi Serrao
(74) *Attorney, Agent, or Firm* — Foley & Lardner LLP

(57) ABSTRACT

Presented are systems, methods, apparatuses, or computer-readable media for coordinating Quality of Experience (QoE) management collection (QMC) configuration. A first network node may receive a QMC configuration from a network management system. The first network node may send a notification to a second network node informing about the receipt of the QMC configuration. The first network node may receive a response from the second network node indicating whether the second network node received the QMC configuration.

16 Claims, 9 Drawing Sheets

(56) References Cited

U.S. PATENT DOCUMENTS

| | | | | |
|---|---|---|---|---|
| 2020/0112907 | A1* | 4/2020 | Dao | H04M 15/8016 |
| 2020/0128454 | A1* | 4/2020 | Teyeb | H04W 36/0088 |
| 2020/0280872 | A1* | 9/2020 | Fiorani | H04W 28/24 |
| 2020/0413290 | A1* | 12/2020 | Yang | H04L 47/83 |
| 2021/0014713 | A1* | 1/2021 | Xu | H04W 24/10 |
| 2021/0067998 | A1* | 3/2021 | Li | H04W 72/04 |
| 2021/0298103 | A1* | 9/2021 | Yilmaz | H04W 24/10 |
| 2021/0352749 | A1* | 11/2021 | Szilagyi | H04W 80/06 |
| 2021/0385691 | A1* | 12/2021 | Johansson | H04W 24/00 |
| 2023/0114446 | A1* | 4/2023 | Cochran | A61K 8/44 424/70.13 |
| 2023/0284058 | A1* | 9/2023 | Eklöf | H04W 24/08 370/252 |

FOREIGN PATENT DOCUMENTS

| | | | |
|---|---|---|---|
| WO | WO-2021/228095 | A1 | 11/2021 |
| WO | WO-2022/005360 | A1 | 1/2022 |
| WO | WO-2022/016401 | A | 1/2022 |
| WO | WO-2022/220377 | A1 | 10/2022 |
| WO | WO-2022/225142 | A1 | 10/2022 |

OTHER PUBLICATIONS

International Search Report and Written Opinion for PCT Appl. No. PCT/CN2022/130004 mailed Jul. 6, 2023 (12 pages).

Extended European Search Report for EP Appl. No. 22962269.1, dated Nov. 27, 2024 (10 pages).

Communication pursuant to Article 94(3) EPC for EP Appl. No. 22962269.1, dated Aug. 28, 2025 (6 pages).

Office Action for KR Appl. No. 10-2024-7013974, dated Dec. 19, 2025 (with English translation, 7 pages).

Universal Mobile Telecommunications System (UMTS); LTE; 5G; Telecommunication management; Quality of Experience (QoE) measurement collection; Control and configuration (3GPP TS 28.405 version 16.1.0 Release 16), ETSI TS 128 405 V16.1.0 (Sep. 2021), 18 pages.

Communication pursuant to Article 94(3) EPC on EP App. No. 22962269.1 dated Mar. 5, 2026 (5 pages).

* cited by examiner

OAM 605

MN 610

SN 615

QMC Configuration (620)

Store QMC Configuration (625)

Performs UE Selection and Decides Which Node Is to Configure to UE (630)

635

Configure QoE to UE (640)

Notification Message (645)

650

QMC Configuration (655)

Configure QoE to UE (660)

Notification Message (665)

COORDINATION OF QUALITY OF EXPERIENCE MANAGEMENT COLLECTION CONFIGURATION

CROSS-REFERENCE TO RELATED APPLICATION

This application claims the benefit of priority under 35 U.S.C. § 120 as a continuation of International Patent Application No. PCT/CN2022/130004, filed on Nov. 4, 2022, the disclosure of which is incorporated herein by reference in its entirety.

TECHNICAL FIELD

The disclosure relates generally to wireless communications, including but not limited to systems and methods for coordinating Quality of Experience (QoE) management collection (QMC) configuration.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for coordinating Quality of Experience (QoE) management collection (QMC) configuration. A first network node may receive a QMC configuration from a network management system. The first network node may send a notification to a second network node informing about the receipt of the QMC configuration. The first network node may receive a response from the second network node indicating whether the second network node received the QMC configuration.

In some embodiments, the notification may be transferred via at least one of a secondary node (SN) addition request, a SN modification request, or a new defined XnAP message to query whether the second network node has received the QMC configuration from an Operations, Administration, and Maintenance (OAM). In some embodiments, the first network node may communicate, with the second network node, an indication that a QoE configuration of one or more wireless communication devices in accordance with the QMC configuration is successful. In some embodiments, the indication may be transferred via at least one of a secondary node (SN) addition request, a SN modification request, or a new defined XnAP message to notify that the QoE configuration is successful.

In some embodiments, the first network node may be a master node (MN) and the second network node may be the secondary node (SN). In some embodiments, the first network node may determine, responsive to receiving the response indicating that the second network node received the QMC configuration, whether the first network node or the second network node is to configure one or more wireless communications devices for a QoE configuration in accordance with the QMC configuration.

In some embodiments, the first network node may send, responsive to determining that the second network node is to configure, the QMC configuration to the second network node. In some embodiments, the first network node may configure, responsive to receiving the response indicating that the second network node did not receive the QMC configuration, one or more wireless communications devices for a QoE configuration in accordance with the QMC configuration.

In some embodiments, the first network node may identify a time elapsed from receipt of the first network node receiving the QMC configuration to wait for receipt of a second notification indicating that the second network node has received the QMC configuration. In some embodiments, the first network node may determine, responsive to the elapsed time exceeding a threshold, that the second network node did not receive the QMC configuration.

In some embodiments, the first network node may determine, responsive to determining that the second network node did not receive the QMC configuration, whether the first network node or the second network node is to configure one or more wireless communications devices for a QoE configuration in accordance with the QMC configuration. In some embodiments, the first network node may configure, responsive to determining that the second network node did not receive the QMC configuration, one or more wireless communications devices for a QoE configuration in accordance with the QMC configuration. In some embodiments, the first network node may send, responsive to determining that the second network node did not receive the QMC configuration, the QMC configuration to the second network node to be used to configure one or more wireless communications devices for a QoE configuration.

In some embodiments, the first network node may be a secondary node (SN) and the second network node may be a master node (MN). In some embodiments, the first network node may send, responsive to receiving the response indicating that the second network node did not receive the QMC configuration, the QMC configuration to the second network node. In some embodiments, the first network node may receive, from the second network node, a message indicating a determination of whether the first network node or the second network node is to configure one or more wireless communications devices for a QoE configuration in accordance with the QMC configuration.

In some embodiments, the first network node may configure, responsive to receipt of the message indicating that the first network node is to configure, the one or more wireless communications devices for the QoE configuration in accordance with the QMC configuration. In some embodiments, the first network node may configure, responsive to receipt of the message indicating that the first network node is to configure, the one or more wireless communications devices for the QoE configuration in accordance with the QMC configuration.

In some embodiments, the first network node may identify a time elapsed from receipt of the first network node receiving the QMC configuration to wait for receipt of a second notification indicating that the second network node has received the QMC configuration. In some embodiments, the first network node may determine, responsive to the elapsed time exceeding a threshold, that the second network node did not receive the QMC configuration.

In some embodiments, the first network node may configure, responsive to determining that the second network node did not receive the QMC configuration, one or more wireless communications devices for a QoE configuration in accordance with the QMC configuration. In some embodiments, the first network node may send, responsive to determining that the second network node did not receive the QMC configuration, the QMC configuration to the second network node to be used to determine whether the first network node or the second network node to configure one or more wireless communications devices for a QoE configuration.

In some embodiments, the first network node may receive, from the second network node, a message indicating a determination of whether the first network node or the second network node is to configure one or more wireless communications devices for a QoE configuration in accordance with the QMC configuration. In some embodiments, the first network node may configure, responsive to receipt of the message indicating that the first network node is to configure, the one or more wireless communications devices for the QoE configuration in accordance with the QMC configuration.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
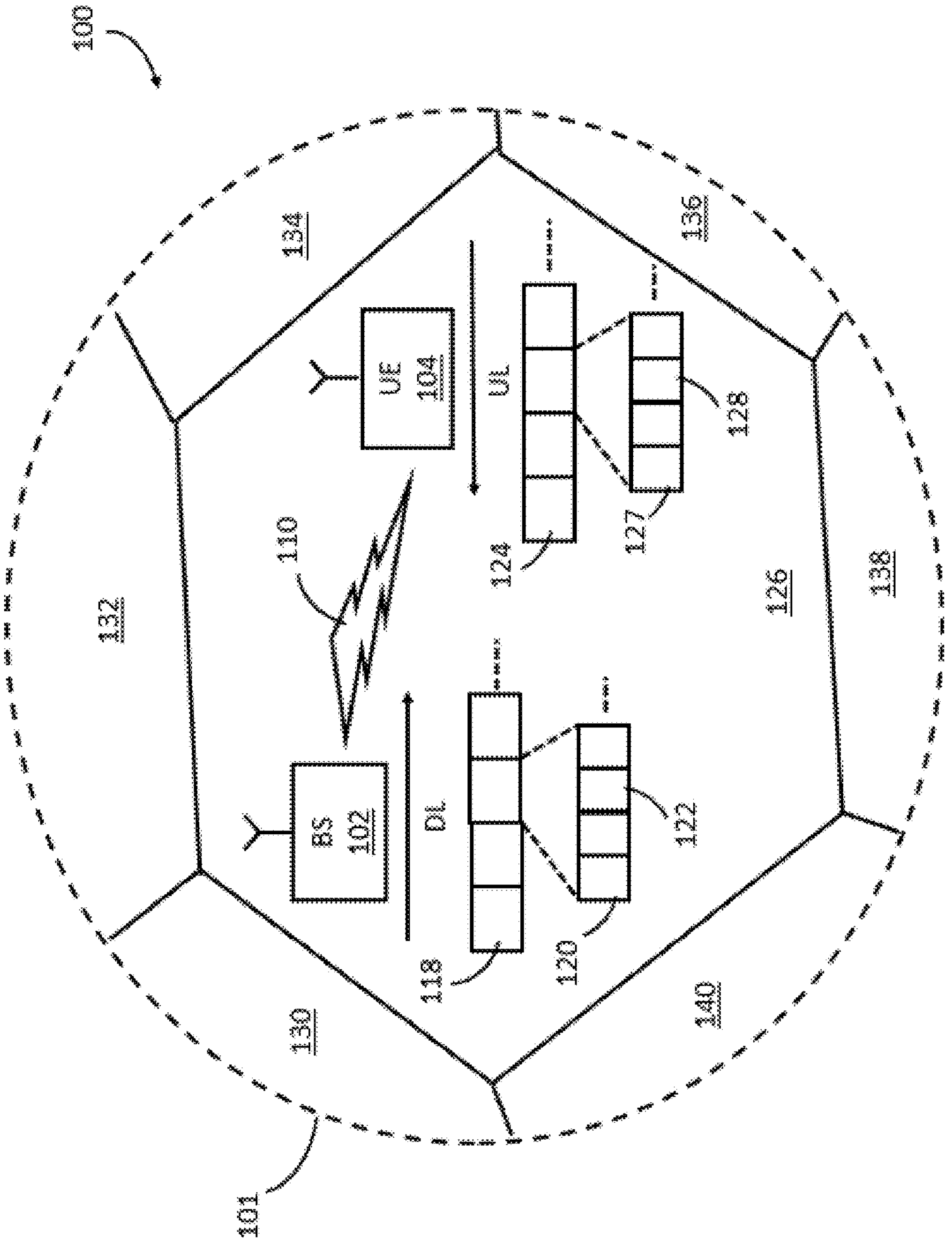
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
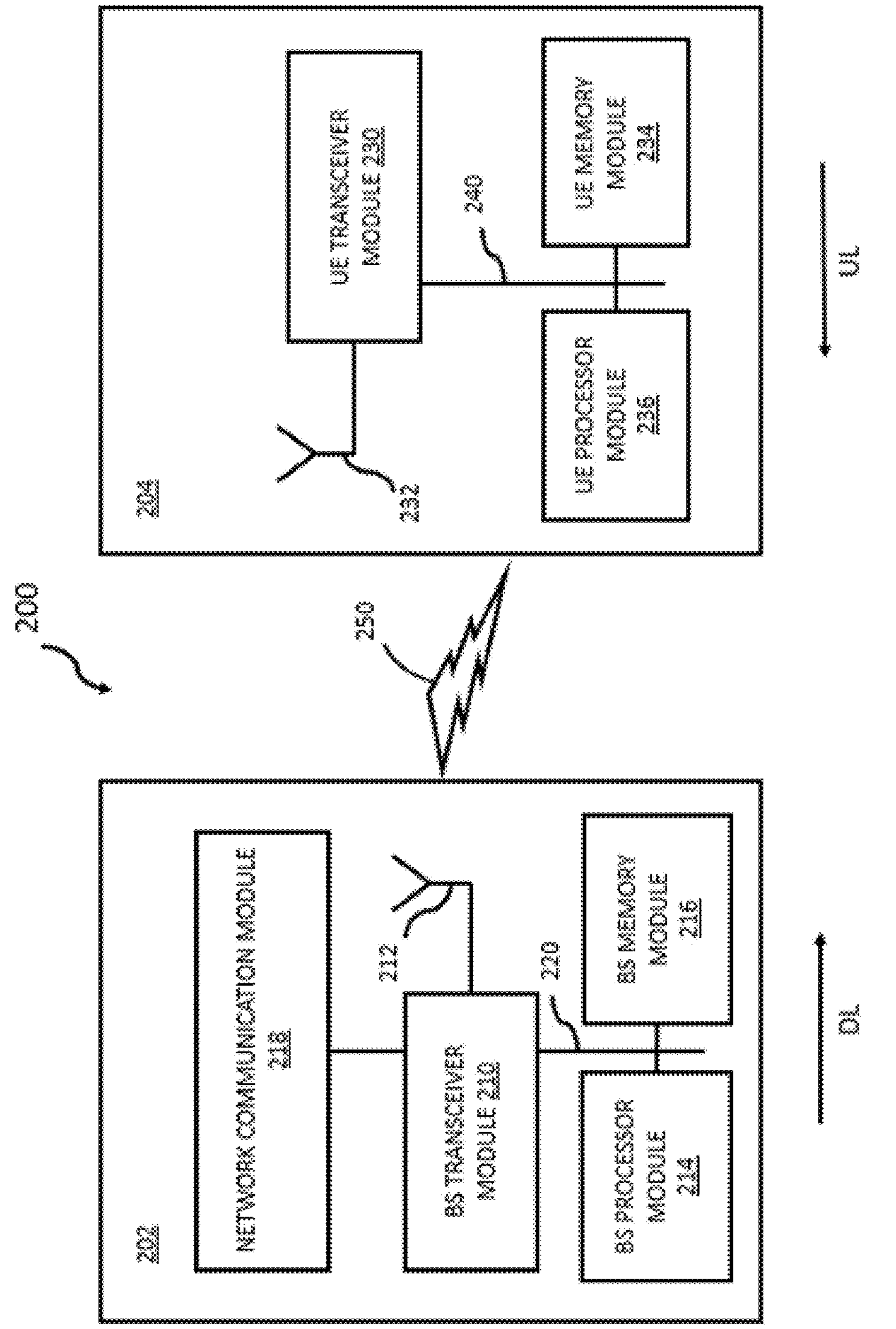
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms “configured for,” “configured to” and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, “open system interconnection model”) is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Coordinating Quality of Experience (QoE) Management Collection (QMC) Configuration Quality of Experience (QoE) measurements may be configured to collect the measurement results in the application layer, which may reflect the user experience. The QoE management and optimization in standalone architecture may include the configuration, reporting, mobility, radio access network (RAN) visible QoE, and minimization of drive tests (MDT)-QoE alignment, among others. However, the QoE management in dual connectivity architecture may have not been resolved. In dual connectivity, where a user equipment (UE) may be connected to two RAN nodes, how to configure the QoE measurement to UE may remain an issue.

For management-based QoE measurement, the OAM may not be aware of the dual connectivity architecture. Both a master node (MN) and a secondary node (SN) may receive the QMC configuration from an operations, administration, and maintenance (OAM). Neither of the MN nor SN, however, may be aware about whether the same QMC configuration has been sent to the other node. Coordination between MN and SN may be useful for the configuration of management-based QoE to UE, to prevent duplicated configurations and unnecessary waste of signaling. Presented herein is are systems and methods for the coordination between MN and SN for the management-based QoE measurement collection.

New radio (NR) QoE measurement collection (QMC) function may be activated by OAM via a separate QMC framework. For signalling-based QoE, the QMC configuration for a specific UE may be sent from OAM to a CN (Core Network), and then CN may send the QMC configuration to a RAN node via UE-associated signalling. For management-based QoE, the OAM may send the QMC configuration to RAN node. The RAN node may select UEs which satisfy the condition for QoE measurement, and may send the configuration to the UEs.

The management-based QMC configuration sent from OAM may include the following information: (1) a QoE Reference; (2) service type; (3) area scope; (4) QoE configuration container; (5) slice list; and (6) available RAN visible QoE metrics, among others.

For the QoE reporting in standalone architecture, UE application (APP) layer may collect the QoE metrics and may send the collected data to UE access stratum (AS) layer via an attention (AT) command. The UE AS layer may send the QoE report to RAN node. Afterward the RAN node may transfer the received QoE reports to a measurement collection entity (MCE). The MCE may be an entity that can collect QoE measurement reports and make analysis for optimization.

In dual connectivity, UE may be connected to two RAN nodes. One anode may act as MN, and another may act as SN. Both the MN and SN may be configured with MDT and collect MDT reports. MDT may be activated via a trace function. The MDT reports may be sent to trace collection entity (TCE, while QoE measurement reports may be sent to MCE.

Figure 3:
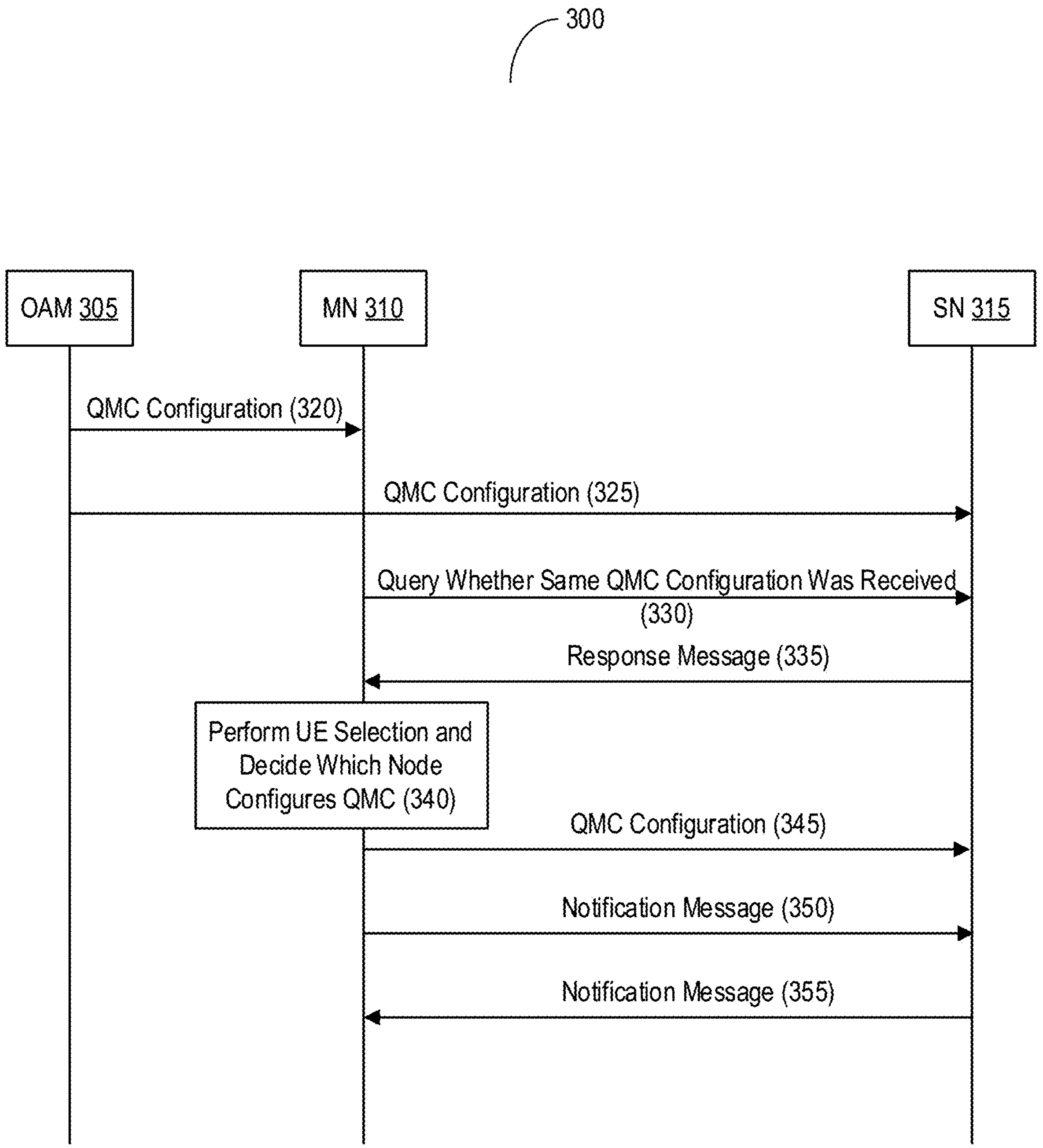
FIG. 3 illustrates a flow diagram of a process of a master node (MN) initiated coordination of Quality of Experience (QoE) management collection (QMC) configuration, with the MN initially receiving the QMC, in accordance with an illustrative embodiment.

A. Master Node (MN) Initiated Coordination of Quality of Experience (QoE) Management Collection (QMC) Configuration, With the MN Initially Receiving the QMC Referring now to FIG. 3, depicted is a flow diagram of a process 300 of a master node (MN) initiated coordination of Quality of Experience (QoE) management collection (QMC) configuration, with the MN initially receiving the QMC. Under the process 300, an OAM 305 may send the management-based QMC configuration to the MN 310 (320). The OAM 305 may also send the same management-based QMC configuration to the SN 315 (325). But it may not be known by the MN 310, Specifically, the MN 310 may not be aware whether the same QMC configuration has been received by the SN 315 or not.

Once MN 310 may receive the management-based QMC configuration from OAM 305, the MN 310 may send a XnAP message (e.g., SN addition request, SN modification request, or a new XnAP message) to the SN 315 to inform about the receipt of the QMC configuration and to query whether the same QMC configuration has been received by the SN 315 (330). The message may identify or include: (1) QoE reference; (2) service type; (3) area scope; (4) slice list; (5) MCE IP address; (6) MDT alignment information; (7) available RAN visible QoE measurement configuration; (8) multicast and broadcast services (MBS) session ID; and (9) MBS service area, among others.

The SN 315 may send the response message to the MN 310, to inform the MN 310 about whether the same QMC configuration may have been received by the SN 315 (335). The response message may identify or include at least: (1) QoE reference; (2) explicit or implicit indication about whether the same QMC configuration has been received; and (3) ID(s) of the UE(s) interested by the SN 315, among others.

The MN 310 may perform UE selection and may decide which node is to configure QoE to UE over radio resource control (RRC) message (340). If the response from the SN 315 indicates that the same QMC configuration has been received by the SN 315, MN 310 may decide which node (e.g., the MN 310 or SN 315) is to configure QoE measurement to UE over Uu. If the response from the SN 315 indicates that the same QMC configuration may not be received by the SN 315, MN 310 may configure QoE to UE over Uu by itself, or may determine to send the QMC configuration to the SN 315 and let SN 315 configure QoE to UE over Uu.

If the response from the SN 315 that the same QMC configuration is not received by the SN 315 and the MN 310 may decide to let SN 315 configure QoE to UE over Uu. Furthermore, the MN 310 may send the QMC configuration information to the SN 315 over XnAP (e.g., SN addition request, SN modification request, or a new XnAP message) (345). The QMC configuration information may identify or include: (1) indication about which node is to configure QoE to UE; (2) QoE configuration container; (3) QoE reference; (4) service type; (5) area scope; (6) slice list; (7) MDT alignment indication; (8) available RAN visible QoE metrics; (9) MBS session ID; and (10) MBS service area, among others.

If it is the MN 310 may configure QoE to UE over Uu, the MN 310 may send the notification to the SN 315 over XnAP (e.g., SN addition request, SN modification request, or a new XnAP message) (350) The notification message may identify or include: (1) QoE reference; (2) indication about which node is to configure QoE to UE; (3) MDT alignment indication; (4) available RAN visible QoE configuration information; (5) ID(s) of the configured UE(s) selected by the MN 310; (6) indication about which node to configure QoE to UE (e.g., MN 310 or SN 315), and (7) an RRC identifier of a QoE measurement, among others.

If it is the SN 315 configures QoE to UE over Uu, the SN 315 may send the notification to the MN 310 over XnAP (e.g., SN modification required message, or a new XnAP message) (355). The notification message may identify or include: (1) QoE reference; (2) MDT alignment information, which may be used to transfer the information related to the alignment of MDT and QoE measurements; (3) RAN visible QoE configuration information, which may include the RAN visible QoE configuration interested by the SN 315; (4) ID(s) of the configured UE(s) selected by the MN 310; (5) signaling radio bearer (SRB) information; and (6) an RRC identifier of the QoE measurement, among others.

Figure 4:
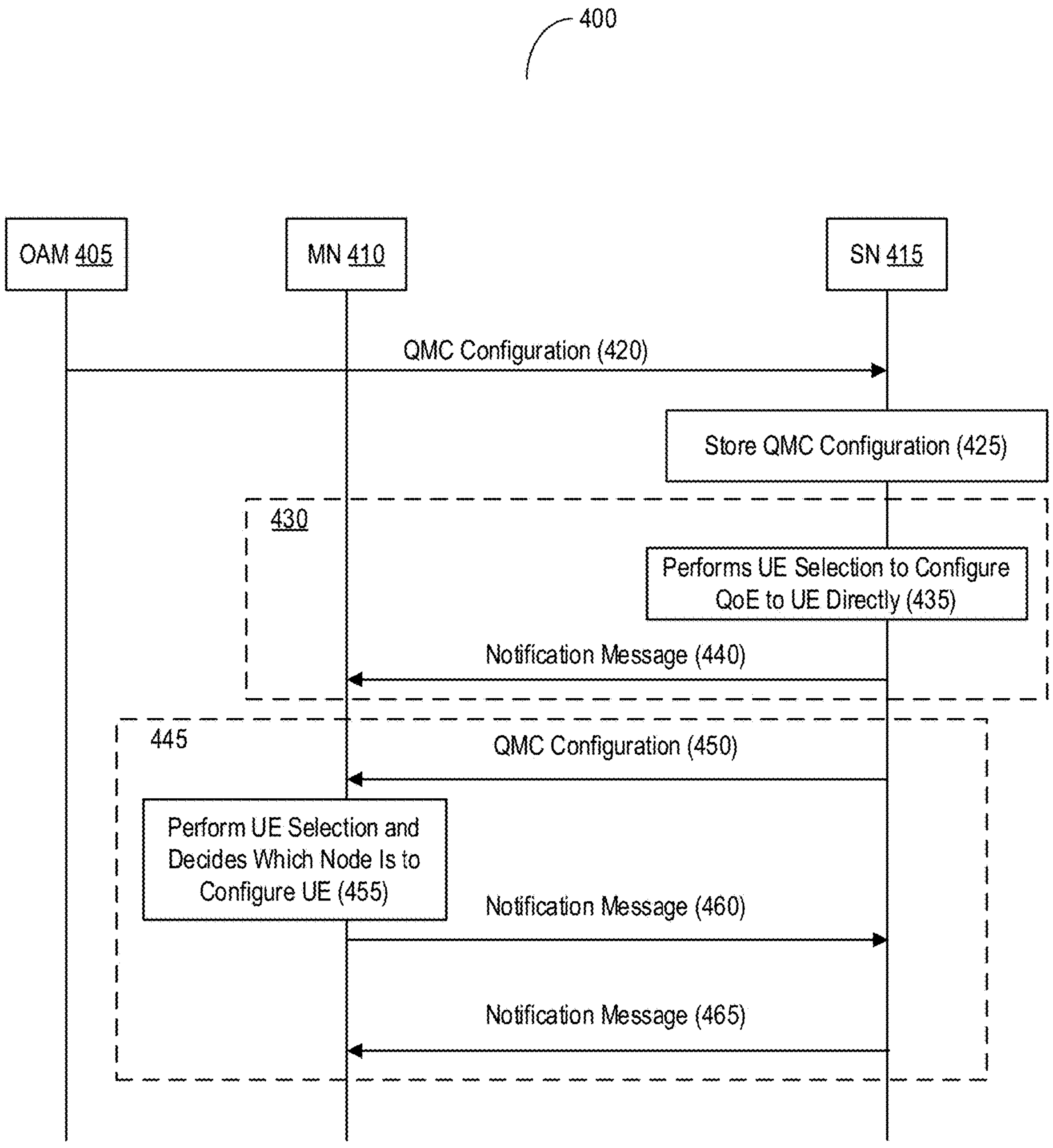
FIG. 4 illustrates a flow diagram of a process of a master node (MN) initiated coordination of Quality of Experience (QoE) management collection (QMC) configuration, with a secondary node (SN) initially receiving the QMC, in accordance with an illustrative embodiment.

B. Master Node (MN) Initiated Coordination of Quality of Experience (QoE) Management Collection (QMC) Configuration, With a Secondary Node (SN) Initially Receiving the QMC Referring now to FIG. 4, depicted is a flow diagram of a process 400 of a master node (MN) initiated coordination of Quality of Experience (QoE) management collection (QMC) configuration, with a secondary node (SN) initially receiving the QMC. Under the process 400, OAM 405 may send the management-based QMC configuration to the SN 415. The same QMC configuration from OAM 405 may not be sent to the MN 410, but this may not be known by the SN 415. In particular, the SN 415 may not be aware of whether the same QMC configuration has been sent to the MN 410.

The SN 415 stores the received QMC configuration (425). Once the QMC configuration is received, a timer may start to calculate the time before the MN 410-initiated message may be received by the SN 415. If the timer expires (exceeds a threshold configured by the RAN, OAM 405, or Access and Mobility Function (AMF)) before the SN 41 receives the message from the MN 410, it can be assumed that the MN 410 does not receive the same QMC configuration received by the SN 415. Furthermore, it can be assumed that this management-based QMC configuration may only be received by the SN 415.

In some embodiments, under sub-process (430), when the SN 415 determines that the management-based QMC configuration is only received by the SN 415, the SN 415 may perform the UE selection by itself and may configure QoE to UE over Uu directly (435). After the SN 415 configures QoE to UE, the SN 415 may send a notification message to the MN 410 over XnAP (e.g., SN modification required, or a new XnAP message from SN 415 to MN 410) (440). The notification message may identify or include: (1) QoE reference; (2) indication about which node is to configure QoE to UE; (3) MDT alignment information, which may be used to transfer the information related to the alignment of MDT and QoE measurements; (4) RAN visible QoE configuration information, which may include the RAN visible QoE configuration interested by the SN 415; (5) ID(s) of the configured UE(s) selected by the SN 415; and (6) SRB information, (7) an RRC identifier of the QoE measurement, among others.

In some embodiments, under sub-process (445), the SN 415 may send the QMC configuration to the MN 410 via XnAP message (e.g., SN modification required message, or a new XnAP message) (450). The MN 410 may perform UE selection and may decide which node (MN 410 or SN 415) is to configure QoE to UE over Uu (455). If the MN 410 may decides to let the SN 415 configures QoE to UE, the MN 410 may send a notification message to the SN 415 over XnAP (e.g., SN modification request, or a new XnAP message) (460). If MN 410 decides to configure to UE by itself, the MN 410 may also send a notification message to inform the SN 415 about the decision. The notification message from the MN 410 to the SN 415 may identify or include: (1) indication about which node is to configure QoE to UE; (2) QoE reference; (3) ID(s) of the configured UE(s) selected by the MN; (4) MDT alignment information; (5) available RAN visible QoE configuration information; (6) MBS session ID; and (7) MBS service area, (8) an RRC identifier of the QoE measurement, among others.

If it is the SN 415 that may configure QoE to UE, after the SN 415 has send QoE configuration to UE over RRC message, the SN 415 may send a notification message to the MN 410 (465). The notification message may be to inform that the management-based QoE has been configure to UE successfully. The notification message from the SN 415 to the MN 410 may identify or include: (1) QoE reference; (2) MDT alignment information, which may be used to transfer the information related to the alignment of MDT and QoE measurements; (3) RAN visible QoE configuration information, which includes the RAN visible QoE configuration interested by the SN 415; (4) ID(s) of the configured UE (s) selected by the MN 410; and (5) SRB information, (6) an RRC identifier of the QoE measurement, among others.

Figure 5:
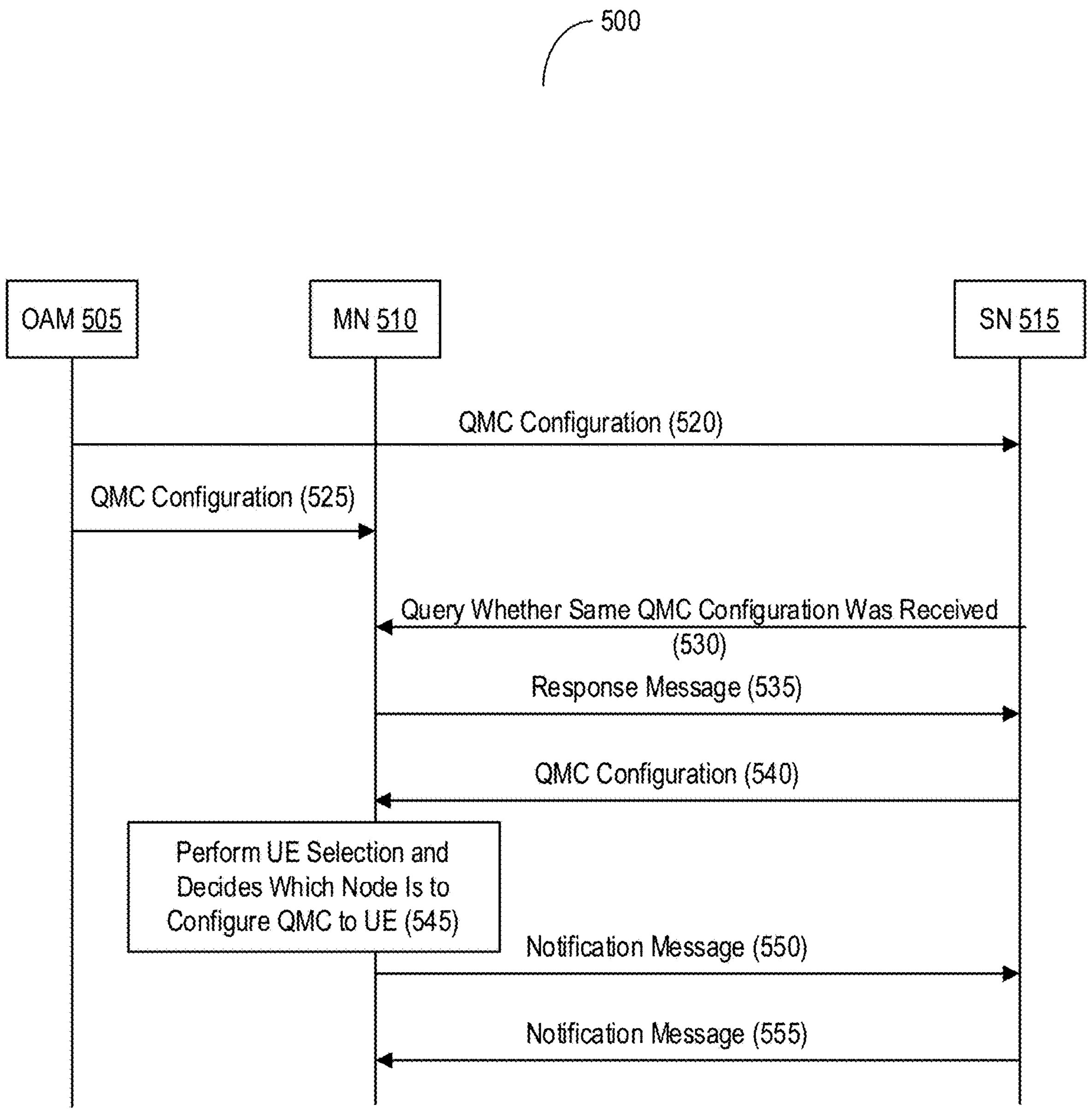
FIG. 5 illustrates a flow diagram of a process of a secondary node (SN) initiated coordination of Quality of Experience (QoE) management collection (QMC) configuration, with the SN initially receiving the QMC, in accordance with an illustrative embodiment.

C. Secondary Node (SN) Initiated Coordination of Quality of Experience (QoE) Management Collection (QMC) Configuration, With the SN Initially Receiving the QMC Configuration Referring now to FIG. 5, depicted is a flow diagram of a process 500 of a secondary node (SN) initiated coordination of Quality of Experience (QoE) management collection (QMC) configuration, with the SN initially receiving the QMC. Under the process 500, OAM 505 may send the management-based QMC configuration to the SN 515 (520). The OAM 505 may also send the same management-based QMC configuration to the MN 510 (525). It may not be known by the SN 515. Specifically, the SN 515 may not be aware whether the same QMC configuration has been sent to the MN 510 or not.

Once the SN 515 receives the management-based QMC configuration from OAM 505, the SN 515 may send an XnAP message (e.g. SN addition request, SN modification request, or a new XnAP message) to the MN 510 to inform about the receipt of the QMC configuration and to query about whether the same QMC configuration has been received by the MN 510 (530). The message may identify or include: (1) QoE reference; (2) service type; (3) MBS session ID; (4) MBS service area; (5) area scope; (6) slice list; (7) MCE IP address; (8) MDT alignment information; and (9) available RAN visible QoE measurement configuration, among others.

The MN 510 may send the response message to the SN 515, to inform the SN 515 about whether the same QMC configuration has been received by the MN 510 (535). The response message may identify or include: (1) QoE reference and (2) explicit or implicit indication about whether the same QMC configuration has been received, among others.

In some embodiments, if the response message from the MN 510 indicates that MN 510 has not received the same QMC configuration from OAM 505, the SN 515 may send the QMC configuration to the MN 510 via XnAP message (e.g., SN modification required, or a new XnAP message) (540). The QMC configuration information may identify or include: (1) QoE configuration container; (2) QoE reference; (3) service type; (4) area scope; (5) slice list; (6) MDT alignment indication; (7) available RAN visible QoE metrics; (8) MBS session ID; and (9) MBS service area, among others. In some embodiments, the SN 515 may also decide to configure QoE to UE by itself, if the MN 510 does not receive the same QMC configuration. The process may be similar as described above in sub-process 445.

The MN 510 may perform UE selection and determine which node (MN 510 or SN 515) to configure QoE to UE over Uu (545). If the MN 510 decides to let the SN 515 configures QoE to UE, the MN 510 may send a notification message to the SN 515 over XnAP (e.g., SN modification request, or a new XnAP message) (550). If MN 510 decides to configure to UE by itself, the MN 510 may also send a notification message to inform the SN 515 about the decision (550). The notification message from the MN 510 to the SN 515 may identify or include: (1) indication about which node configures QoE to UE; (2) QoE reference; (3) ID(s) of the UE(s) selected by the MN; (4) MDT alignment information; (5) available RAN visible QoE configuration information; and (6) RRC identifier of the QoE measurement, among others.

If it is the SN 515 that configures QoE to UE, after the SN 515 has send QoE configuration to UE over RRC message, the SN 515 may send a notification message to the MN 510 (555). The notification message may be to inform that the management-based QoE has been configure to UE successfully. The notification message from the SN 515 to the MN 510 may identify or include: (1) QoE reference; (2) MDT alignment information, which is used to transfer the information related to the alignment of MDT and QoE measurements; (3) RAN visible QoE configuration information, which includes the RAN visible QoE configuration interested by the SN 515; (4) IDs of the configured UE(s) selected by the MN 510; (5) SRB information; and (6) an RRC identifier of the QoE measurement, among others.

Figure 6:
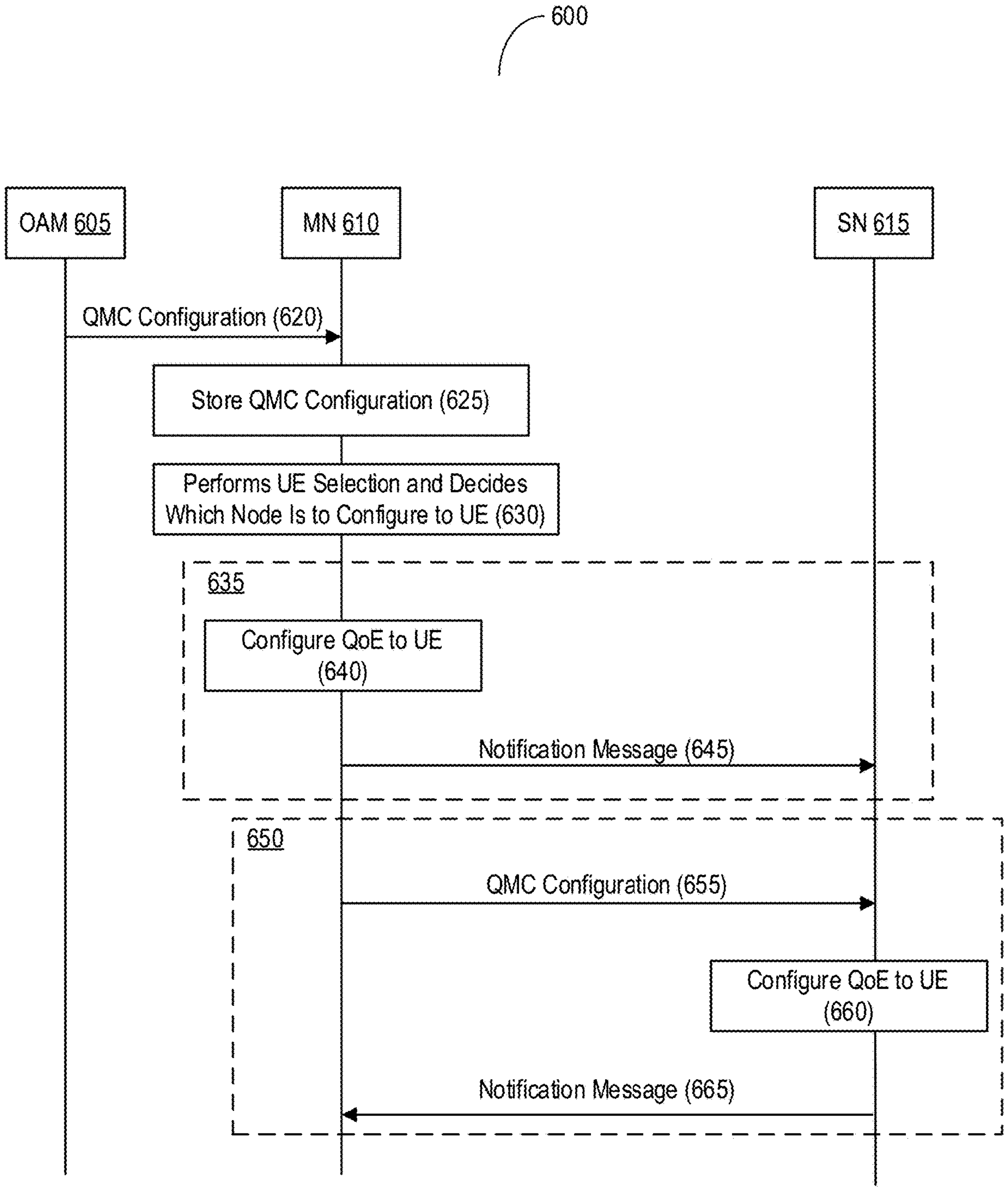
FIG. 6 illustrates a flow diagram of a process of a secondary node (SN) initiated coordination of Quality of Experience (QoE) management collection (QMC) configuration, with a master node (MN) initially receiving the QMC, in accordance with an illustrative embodiment.

D. Secondary Node (SN) Initiated Coordination of Quality of Experience (QoE) Management Collection (QMC) Configuration, With a Master Node (MN) Initially Receiving the QMC Configuration Referring now to FIG. 6, depicted is a flow diagram of a process 600 of a secondary node (SN) initiated coordination of Quality of Experience (QoE) management collection (QMC) configuration, with a master node (MN) initially receiving the QMC. Under the process 600, OAM 605 may send the management-based QMC configuration to the SN 615 (620). The same QMC configuration from OAM 605 may not be sent to the SN 615. But the send of the QMC configuration may not be known by the MN 610. Specifically the MN 610 may not be aware whether the same QMC configuration has been sent to the SN 615.

The MN 610 may the received QMC configuration (625). Once the QMC configuration is received, a timer may store to record the time before the SN 615-initiated message (e.g., similar as the process 400) is received by the SN 615. If the timer expires (exceeds a configured threshold configured by the RAN/AMF/OAM 605) before the MN 610 receives the message from the SN 615, it can be assumed that the SN 615 does not receive the same QMC configuration received by the MN 610. Furthermore, it can be assumed that this management-based QMC configuration is only received by the MN 610. The MN 610 may perform UE selection and decide which node is to configure QoE to UE over Uu (630).

In some embodiments, under sub-process 635, the MN 610 may configure QoE to UE via RRC message (640). The MN 610 may send the notification to the SN 615 over XnAP (e.g., SN addition request, SN modification request, or a new XnAP message) (645). The notification message may identify or include: (1) indication about which node configures QoE to UE; (2) QoE reference; (3) IDs of the configured UE(s) selected by the MN 610; (4) MDT alignment information; (5) available RAN visible QoE configuration information; and (6) RRC identifier of the QoE measurement, among others.

In some embodiments, under sub-process 650, the MN 610 may decide to let SN 615 configure QoE to UE over Uu. The MN 610 may send the QMC configuration information to the SN 615 via XnAP message (e.g., SN 615 addition request, SN 615 modification request, or a new XnAP message) (655). The QMC configuration information may identify or include: (1) indication about which node configures QoE to UE; (2) QoE configuration container; (3) QoE reference; (4) service type; (5) area scope; (6) slice list; (7)

MDT alignment indication; (8) available RAN visible QoE metrics; (9) MBS session ID; and (10) MBS service area, among others.

After the SN 615 may receive the QMC configuration information from the MN 610, the SN 615 may configure QoE to UE via RRC message (660). After the SN 615 has configured QoE to UE, the SN 615 may send a notification message to the MN 610 over XnAP (e.g., SN 615 modification required message, or a new XnAP message) (665). The notification message may identify or include: (1) QoE reference; (2) MDT alignment information, which may be used to transfer the information related to the alignment of MDT and QoE measurements; (3) RAN visible QoE configuration information, which includes the RAN visible QoE configuration interested by the SN 615; (4) ID(s) of the configured UE(s) selected by the SN 610; (5) SRB information; and (6) an RRC identifier of the QoE measurement, among others.

Figure 7:
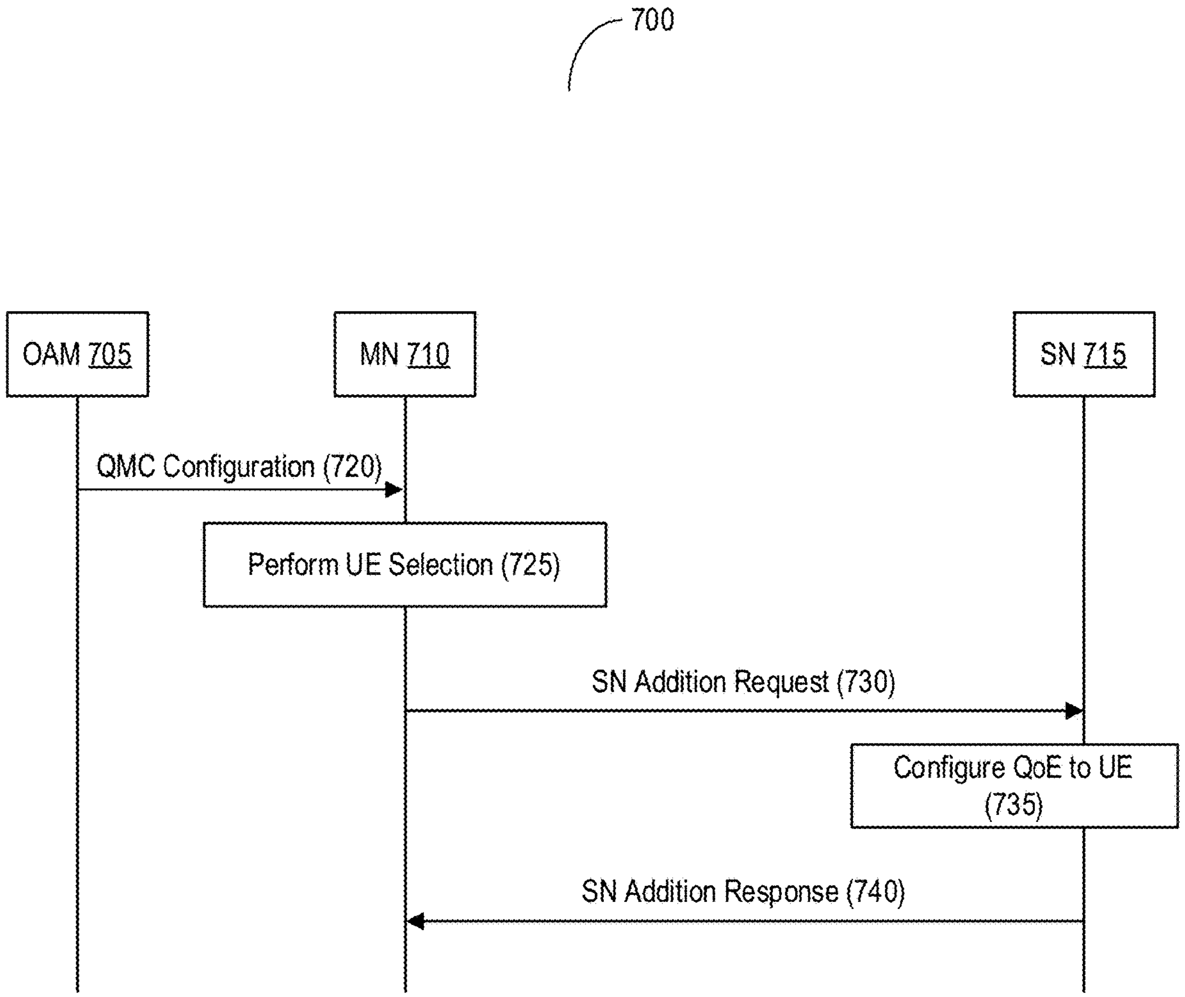
FIG. 7 illustrates a flow diagram of a process of Quality of Experience (QoE) management collection (QMC) configuration in secondary node (SN) addition, in accordance with an illustrative embodiment.

F. Quality of Experience (QoE) Management Collection (QMC) Configuration in Secondary Node (SN) Addition Referring now to FIG. 7, depicted is a flow diagram of a process 700 of Quality of Experience (QoE) management collection (QMC) configuration in secondary node (SN) addition. Under the process 700, an OAM 705 may send the configuration to the MN 710 (720). The MN 710 may perform UE selection (725).

The MN 710 may trigger the SN 715 addition procedure. The MN 710 may send a SN addition request message to the SN 715. The QMC configuration may be sent to the SN 715 via this message, and may identify or include: (1) QoE reference; (2) service type; (3) area scope; (4) slice list; (5) MCE IP address; (5) MDT alignment information; (6) available RAN visible QoE measurement configuration; (7) MBS session ID; (8) MBS service area; (9) indication about which node to configure QoE to UE; (10) ID(s) of the configured UE(s) selected by the MN 710; and (11) SRB information, among others. If the information in this message indicates that the SN 715 should configure the SN 715 to UE, the SN 715 may establish the SRB according to the requested SRB information in the SN addition request message, and may send the QoE configuration to UE via RRC message.

The SN 715 may send the SN addition response message to the MN 710 (740). The message may identify or include: (1) QoE reference; (2) MDT alignment information, which may be used to transfer the information related to the alignment of MDT and QoE measurements; (3) RAN visible QoE configuration information, which may include the RAN visible QoE configuration interested by the SN 715; (4) IDs of the configured UE selected by the SN 710; and (5) SRB information, among others.

Figure 8A:
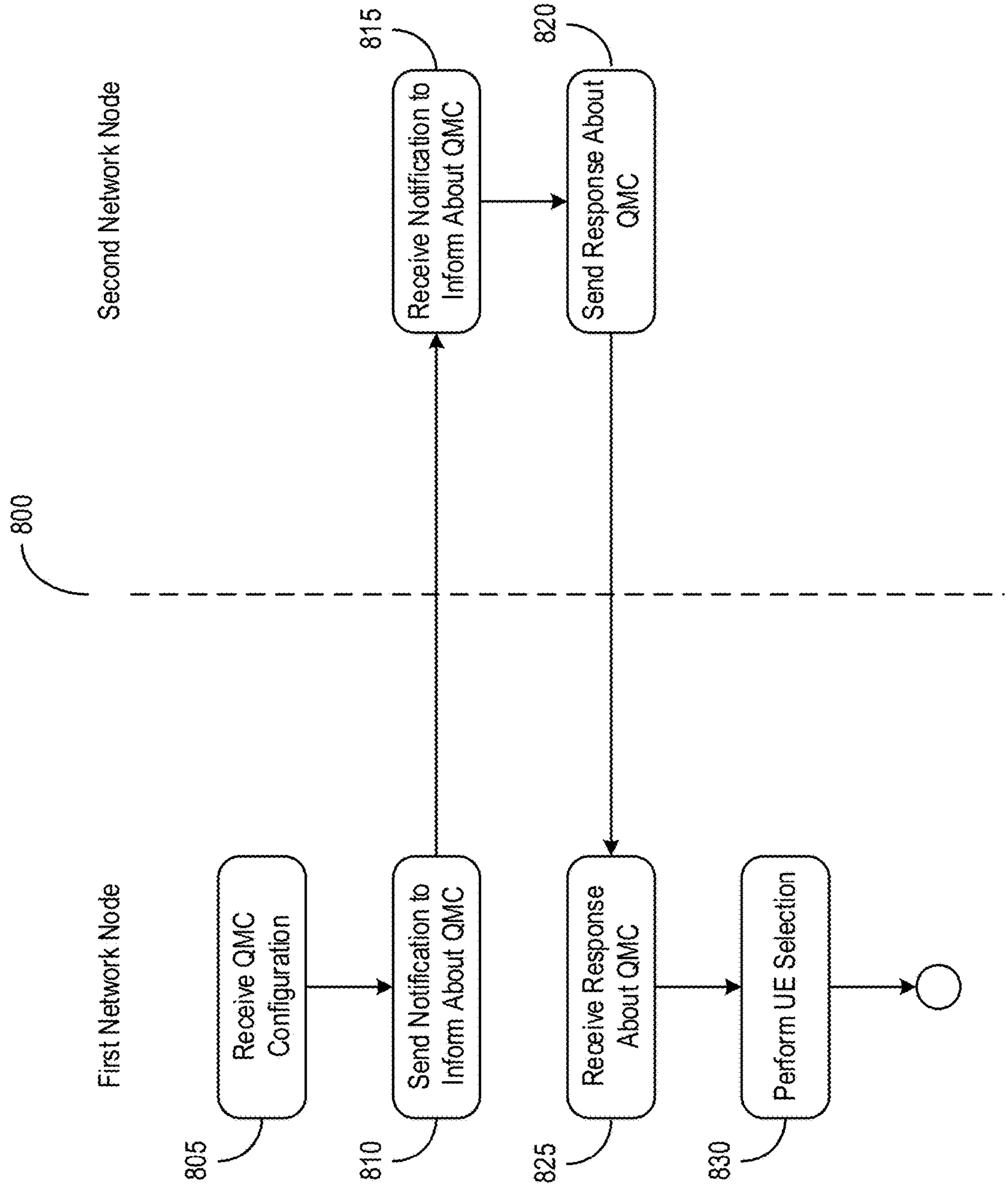
FIGS. 8A and 8B illustrate a flow diagram of a method of coordinating Quality of Experience (QoE) management collection (QMC) configuration, in accordance with an illustrative embodiment.
Figure 8B:
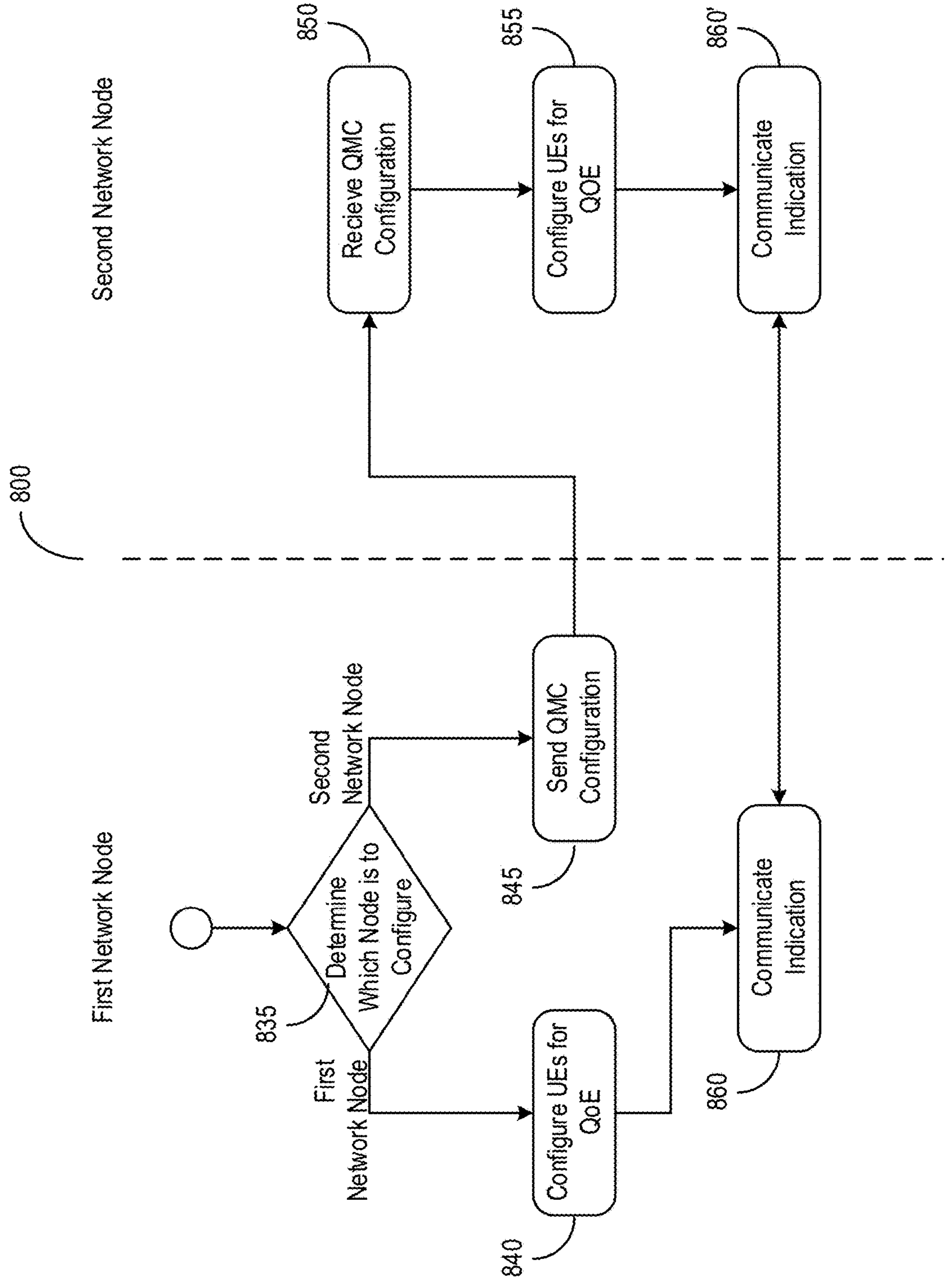

G. Process of Coordinating Quality of Experience (QoE) Management Collection (QMC) Configuration Referring now to FIGS. 8A and 8B, depicted is a flow diagram of a method 800 of coordinating Quality of Experience (QoE) management collection (QMC) configuration. The method 800 may be performed by or implemented using any of the components described above, such as the BS 102 or 202, UE 104 or 104, OAM 305, 405, 505, 605, or 705, MN 310, 410, 510, 610, or 710, or SN 315, 415, 515, 615, or 715, among others. In brief overview, a first network node may receive a Quality of Experience (QoE) management collection (QMC) configuration (805). The first network node may send a notification to inform about QMC configuration to a second network node (810). The second network node may receive the notification to inform about the QMC configuration (815). The second network node may send a response about the QMC configuration (820). The first network node may receive the response about the QMC configuration (825). The first network node may perform UE selection (830). The first network node may determine which node is to configure (835). If the determination is that the first network node is to configure, the first network node may configure the UEs for QoE (840). Otherwise, if the determination is that the second network node is to configure, the first network node may send the QMC configuration to the second network node (845). The second network node may receive the QMC configuration (850). The second network node may configure UEs for QoE (855). The first network node and the second network node may communicate an indication regarding the QoE configuration (860 and 860').

In further detail, a first network node may identify, retrieve, or otherwise receive a Quality of Experience (QoE) management collection (QMC) configuration (805). The QMC configuration may be received from a network management system. The network management system may include, for example, an Operations, Administration, and Maintenance (OAM). The QMC configuration may identify or include: (1) QoE Reference; (2) a service type; (3) an area scope; (4) a QoE configuration container; (5) a slice list; and (6) an available RAN visible QoE metrics, among others. Upon receipt, the first network node may store and maintain the QMC configuration. The network management system may or may not have sent the same QMC configuration to a second network node. The first network node may be one of a master node (MN) or a second node (SN), and may correspond to a node that first receives the QMC configuration. The second network node may be one of the MN or SN, and may differ from the node to which the first network node corresponds to. In some embodiments, the first network node may be the MN and the second network node may be the SN. In some embodiments, the first network node may be the SN and the second network node may be the MN.

The first network node may provide, transmit, or otherwise send a notification to inform about receipt of the QMC configuration to the second network node (810). The notification may be to query whether the second network node has received the QMC configuration from the network management system (e.g., the OAM). In some embodiments, the notification may be transferred via a SN additional request, a SN modification request, or a new defined XnAP message, among others. In some embodiments, the first network node may refrain from sending the notification, and may wait for receipt of a notification from the second network node indicating that the second network node has received the QMC configuration. The second network node may retrieve, identify, or otherwise receive the notification to inform about the receipt of the QMC configuration from the first network node (815).

The second network node may provide, transmit, or otherwise send a response about the QMC configuration (820). The response may identify or identify whether the second network node has also received the same QMC configuration from the network management system (e.g., OAM). Upon receipt of the notification to query, the second network node may determine whether the second network node has received the QMC configuration from the network management system. If the QMC configuration was not received, the second network node may send the response to indicate that the QMC configuration was not received. In contrast, if the QMC configuration was received, the second network node may send the response to indicate that the QMC was received.

In turn, the first network node may retrieve, identify, or otherwise receive the response about the receipt of the QMC configuration from the second network node (825). Upon receipt, the first network node may parse the response to determine whether the second network node has received the QMC configuration from the network management system. If the response indicates no receipt of the QMC configuration, the first network node may determine that the second network node has not received the QMC configuration. Otherwise, if the response indicates receipt of the QMC configuration, the first network node may determine that the second network node has received the QMC configuration.

In some embodiments, the first network node may measure, determine, or otherwise identify a time elapsed from the receipt of the QMC configuration to wait for receipt of a notification indicating that the second network node has received the QMC configuration. The identification of the time may be carried out, when the first network node does not send the notification to query about the receipt of the QMC configuration to the second network node. The first network node may maintain a timer to keep track of the elapsed time.

The first network node may compare the elapsed time to a threshold. The threshold may define or identify a value of the elapsed time at which it can be assumed that the second network node did not receive the QMC configuration. If the elapsed time has not exceeded the threshold and no notification is received from the second network node, the first network node may continue to wait for receipt. If the notification is received within the threshold time, the first network node may determine that the second network node has received the QMC configuration. If the elapsed time exceeds the threshold, the first network node may identify or determine that the second network node did not receive the QMC configuration.

The first network node may carry out, execute, or otherwise perform selection of one or more wireless communication devices (e.g., UEs 104 or 204) for QoE configuration (830). The one or more wireless communication devices may be selected for configuration for QoE in accordance with the QMC configuration. In some embodiments, the first network node may omit the performance of the selection of the one or more wireless communication devices at this juncture. In some embodiments, the second network node may carry out the selection of the one or more wireless communication devices at a later junction using the QMC configuration.

The first network node may select, identify, or otherwise determine which node (e.g., the first network node or the second network node) is to configure the one or more wireless communication devices for QoE configuration in accordance with the QMC configuration (835). In some embodiments, the first network node may determine which node is to configure, in response to receipt of the response about the receipt of the QMC configuration from the second network node. In some embodiments, the second network node may perform the determination as to which node is to configure. The determination by the second network node may be in response to provision of the QMC configuration by the first network node upon determining that the second network node did not receive the QMC configuration from the network management system. The response may indicate that the second network node did or did not receive the QMC configuration. The selection of which node may be based on the QMC configuration, and may be independent of whether the second network node is determined to have or have not received the same QMC configuration from the network management system.

If the determination is that the first network node is to configure, the first network node may setup or configure the one or more wireless communication devices for the QoE configuration in accordance with the QMC configuration (840). In some embodiments, when the response indicates that the second network node did not receive the QMC configuration or the second network node is determined to have not received the QMC configuration, the first network node may perform the configuration. In performing the configuration, the first network node may also perform the selection of the one or more wireless communication devices as discussed above. With the selection, the first network node may enable or apply the one or more wireless communication devices for QoE configuration in accordance with the QMC configuration.

Otherwise, if the determination is that the second network node is to configure, the first network node may provide, transmit, otherwise send the QMC configuration to the second network node (845). In some embodiments, when the response indicates that the second network node did not receive the QMC configuration or the second network node is determined to have not received the QMC configuration the first network may send the QMC configuration to the second network node. The QMC configuration may be sent in a message by the first network node to the second network node. In some embodiments, the message may identify the one or more wireless communication devices selected for the QoE configuration. In some embodiments, the QMC configuration may be used by the second network node to configure the one or more wireless communication devices for QoE configuration. In some embodiments, the QMC configuration may be used by the second network node to determine which node is to configure the one or more wireless communication devices for QoE configuration.

The second network node may retrieve, identify, or otherwise receive the QMC configuration from the first network node (850). Upon receipt, the second network node may initiate configuration of the one or more wireless communication devices for QoE configuration. In some embodiments, in response to receipt of the QMC configuration, the second network node may determine which node is to configure the one or more wireless communication devices for QoE configuration. The second network node may provide, transmit, or otherwise send a reply message to the first network node to indicate which node is to perform the configuration. The first network node may in turn receive the message indicating whether the first network node or the second network node is to perform the configuration. If the determination that the first network node is to configure, the second network node may send the message to indicate that the first network node is to configure. The first network node may in turn perform the configuration upon receipt of the message. If the determination that the second network node is to configure, the second network node may send the message to indicate that the second network node is to configure.

The second network node may setup or configure the one or more wireless communication devices for QoE (855). The configuration of the one or more wireless communication devices by the second network node may be similar to the configuration by the first network node. In performing the configuration, the second network node may also perform the selection of the one or more wireless communication devices as discussed above. With the selection, the second network node may enable or apply the one or more wireless communication devices for QoE configuration in accordance with the QMC configuration.

The first network node and the second network node may communicate an indication regarding the QoE configuration (860 and 860'). The indication may be that the QoE configuration of the one or more wireless communication device in accordance with the QMC configuration is successful. In some embodiments, the indication may be transferred via a secondary node (SN) addition request, a SN modification request, or a new defined XnAP message to indicate that the QoE configuration is successful. When the first network node has performed the configuration, the first network node may provide, transmit, or otherwise send the indication regarding the QoE configuration to the second network node. Conversely, when the second network node has performed the configuration, the second network node may provide, transmit, or otherwise send the indication regarding the QoE configuration to the first network node.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term “module” as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method of coordinating Quality of Experience (QoE) management collection (QMC) configuration, comprising:
receiving, by a first network node, a QMC configuration from a network management system;
sending, by the first network node, a notification to a second network node corresponding to the received QMC configuration, the QMC configuration comprising a QoE reference; and
receiving, by the first network node, from the second network node, a response including the QoE reference, the response indicating that the QMC configuration received by the second network node is same as the QMC configuration by the first network node from the network management system,
wherein the first network node is a secondary node (SN) and the second network node is a master node (MN).

2. The method of claim 1, comprising:
receiving, by the first network node from the second network node, an indication of whether the first network node or the second network node is to send QoE configuration to a wireless communication device.

3. The method of claim 2, comprising:
sending, by the first network node, the QoE configuration to the wireless communication device, responsive to the indication.

4. The method of claim 1, wherein the notification is sent via a SN modification request.

5. The method of claim 1, comprising:
sending, by the second network node to the first network node, an indication of whether the first network node or the second network node is to send QoE configuration to a wireless communication device.

6. The method of claim 5, wherein the indication causes the first network node to sends the QoE configuration to the wireless communication device.

7. The method of claim 1, wherein the notification is sent via a SN modification request.

8. A method of coordinating Quality of Experience (QoE) management collection (QMC) configuration, comprising:
receiving, by a second network node, a notification from a first network node corresponding to a QMC configuration from a network management system, and the QMC configuration comprising a QoE reference; and
sending, by the second network node to the first network node, a response including the QoE reference, the response indicating that the QMC configuration received by the second network node is same as the QMC configuration by the first network node from the network management system,
wherein the first network node is a secondary node (SN) and the second network node is a master node (MN).

9. The method of claim 8, wherein the notification is sent via a SN modification request.

10. A first network node, comprising:
at least one processor configured to:
receive, via a transceiver, a Quality of Experience (QoE) management collection (QMC) configuration from a network management system;
send, via the transceiver, a notification to a second network node corresponding to the received QMC configuration, the QMC configuration comprising a QoE reference; and
receive, via the transceiver from the second network node, a response including the QoE reference, the response indicating that the QMC configuration received by the second network node is same as the QMC configuration by the first network node from the network management system,
wherein the first network node is a secondary node (SN) and the second network node is a master node (MN).

11. The first network node of claim 10, wherein the at least one processor is configured to:
receive, via the transceiver from the second network node, an indication of whether the first network node or the second network node is to send QoE configuration to a wireless communication device.

12. The first network node of claim 11, wherein the indication causes the at least one processor to:
send, via the transceiver, the QoE configuration to the wireless communication device.

13. A second network node, comprising:
at least one processor configured to:
receive, via a transceiver, a notification from a first network node corresponding to a Quality of Experience (QoE) management collection (QMC) configuration from a network management system, the QMC configuration comprising a QoE reference; and
send, via the transceiver to the first network node, a response including the QoE reference, the response indicating that the QMC configuration received by the second network node is same as the QMC configuration by the first network node from the network management system,
wherein the first network node is a secondary node (SN) and the second network node is a master node (MN).

14. The second network node of claim 13, wherein the at least one processor is configured to:
sending, by the second network node to the first network node, an indication of whether the first network node or the second network node is to send QoE configuration to a wireless communication device.

15. The second network node of claim 14, wherein the indication causes the first network node to send the QoE configuration to the wireless communication device.

16. The second network node of claim 13, wherein the notification is sent via a SN modification request.

* * * * *